June 15, 1937.   A. F. HOPPE   2,084,030
COMBINED ELECTRICALLY AND HYDRAULICALLY CONTROLLED VALVE
Filed May 14, 1936

INVENTOR
Arnold F. Hoppe

Patented June 15, 1937

2,084,030

UNITED STATES PATENT OFFICE 2,084,030

COMBINED ELECTRICALLY AND HYDRAULICALLY CONTROLLED VALVE

Arnold F. Hoppe, Indianapolis, Ind., assignor to E. C. Atkins and Company, Indianapolis, Ind., a corporation of Indiana Application May 14, 1936, Serial No. 79,741

5 Claims. (Cl. 137—139)

This invention relates to combined electrically and hydraulically controlled valves of that type adapted for hydraulically controlling the passage of fluids therethrough.

One feature of the invention is the provision of a compression chamber in the valve body at a point above the valve whereby the pipe line pressure may be utilized for closing the valve.

A further feature of the invention is the provision of a valve carrying piston having both an inlet and an outlet passage therethrough.

A further feature of the invention is the provision of means for regulating the capacity of the inlet passage and preventing accumulation of foreign particles therein.

A further feature of the invention is the provision of electrically operated means for automatically controlling the outlet passage through the valve carrying piston.

A further feature of the invention is the provision of means for forming a splicing chamber between the compression chamber and the electrical operating means.

A further feature of the invention is the provision of means for maintaining the parts of the valve carrying piston in true alinement with the inlet passage therethrough.

In the accompanying drawing.

Figure 1:
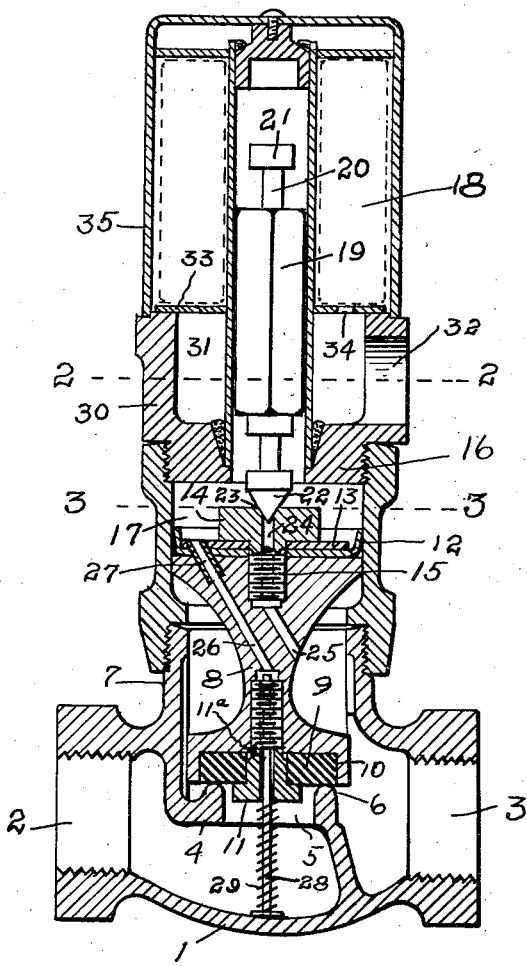
Figure 1 is a vertical transverse sectional view through the valve structure showing the valve closed.
Figure 2:
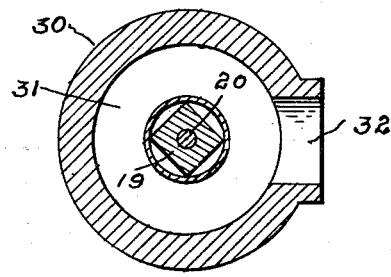
Figure 2 is a sectional view thereof as seen from line 2—2, Fig. 1.
Figure 3:
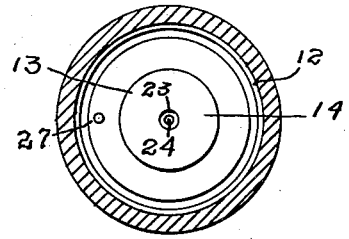
Figure 3 is a sectional view as seen from line 3—3, Fig. 1.

Referring to the drawing, 1 indicates the casing or valve body having an inlet opening 2 and an outlet opening 3, said openings being separated by means of a partition wall 4, said wall having an opening 5, around which is formed a valve seat 6.

Extending outwardly from the body 1 and communicating with the interior thereof is a cylinder 7, in which is mounted a valve carrying piston 8, to which is connected a valve 9 for cooperation with the valve seat 6.

The valve 9 is preferably entered in a recess 10 in the under face of the piston 8 and is held in position by means of a headed stud 11, which is threaded into the under face of the piston 8. Fitting over the upper face of the piston 8 is a sealing cup or ring 12, which is held in place on the piston by placing a plate 13 over the outer face thereof, said plate being in turn held in place by the head 14 of a threaded stem 15, said stem also threading into the piston 8.

The outer end of the cylinder 7 is closed with a removable cap 16, thus forming a compression chamber 17 between the piston 8 and cap 16 and as the cylinder 7 is of greater diameter than the opening 5, and as a greater fluid pressure will form above the piston 8 than is passing through the pipe line to which the valve structure is attached, the line pressure will be overcome and the valve 9 hydraulically forced to closed position where it will be held so long as the pressure is held in the compression chamber 17.

The compression in the chamber 17 is controlled through the medium of a solenoid 18 of any preferred construction, said solenoid having a core 19 for operating a plunger 20. The plunger 20 is provided at its upper end with a head 21 and at its lower end with an auxiliary valve 22, which cooperates with a seat 23 on the outer face of the head 14, said seat fitting around the upper end of a port 24 in the head 14.

The port 24 registers with an outlet passage 25, formed through the piston 8, with its lower end communicating with the outlet end of the valve casing 1, so that when the auxiliary valve 22 is raised from its seat, the fluid in the compression chamber 17 will discharge and reduce the pressure in said chamber, whereupon the line pressure will raise the valve 9 and permit the fluid to flow directly through the valve casing.

The fluid is inducted into the compression chamber 17 through an inlet passage 26, also extending through the piston 8, the lower end of the passage 26 communicating with a port 11a in the stud 11 which in turn communicates with the inlet end 2 of the valve casing 1, the upper end of said passage communicating with the compression chamber 17 and through which the compression is built up in the compression chamber. As the upper portion of the passage 26 extends through the sealing ring 12 and plate 13, they are held in fixed relation with the piston 8 in any suitable manner, preferably by a tube section 27, one end of which enters the openings through the ring 12 and plate 13 with its opposite end entered in the passage 26 in the piston.

The capacity of the port 11a and incidently the inlet passage 26 may be controlled in a suitable manner, preferably by means of a rod 28, one end of which is normally held seated against the lower inner wall of the casing 1 by means of a spring 29. The rod 28 extends upwardly into the port 11a and by providing rods of different diameters or studs 11 with different sized ports 11a, the capacity of the port and passage may be increased or decreased, thus controlling the speed at which the fluid will feed into the compression chamber 17 and incidently timing the closure of the valve 9. As the piston 8 reciprocates and the rod 28 remains substantially stationary, the rod also serves to prevent the collection of any foreign particles in the port 11a and passage 26, thus preventing clogging of the passage and maintaining a uniform flow of fluid therethrough at all times and insuring a uniform closure of the valve.

The cap 16 has a peripheral flange 30 thereon which forms a splicing chamber 31 between the cap proper and the lower end of the solenoid 18 for the storage of the spliced ends of the main wires (not shown) and the wires of the solenoid (not shown), an opening 32 being formed through the flange 30 for the introduction of the main wires.

A separating plate 33 is positioned between the solenoid 18 and upper end of the splicing chamber 31, said plate having an opening 34 for the passage of the wires from the solenoid to the splicing chamber 31, said solenoid being held in place by a housing 35.

In operation, with the parts of the valve structure in the position shown in Fig. 1, the valve is closed, but upon energizing the solenoid 18, the core 19 will be raised and when the core strikes the head 21, the auxiliary valve 22 will be released from the seat 23, which permits the fluid in the compression chamber 17 to escape through the outlet passage 25, thus releasing the hydraulic pressure above the piston 8, and as the passage 25 has an increased outflow over the inflow through the passage 26. When the pressure above the piston is released, the line pressure will force the main valve 9 from its seat 6, so that the fluid will freely flow through the valve structure.

As soon as the solenoid 18 is again de-energized, the core 19 and plunger 20 will descend and close communication through the outlet passage 25. The fluid now immediately begins to flow through the inlet passage 26 and as the compression accumulates in the compression chamber 17, the line pressure will be again overcome and the valve 9 forced against its seat 6, thus stopping the flow of fluid through the valve structure.

What I claim is:

1. In a valve structure, a body portion having an inlet and an outlet, a partition separating said inlet and outlet, said partition having an opening therethrough, a valve seat surrounding said opening, a cylinder associated with said body portion, a piston in said cylinder, said piston having an inlet passage therethrough, a valve carried by said piston, a stud for holding said valve in engagement with said piston, said stud having a port forming a continuation of said inlet passage, a rod like member entering the port from the lower end thereof, the lower end of said rod like member resting on the inner lower wall of said body portion, said rod clearing said port of foreign substances and determining the flow of fluid through said port.

2. In a valve structure, a body portion having an inlet and an outlet opening at its ends, a partition separating said openings, said partition having an opening therethrough, a valve seat surrounding said partition opening, a piston, a valve carried by said piston for cooperation with said seat, said piston having a passageway, a stud for holding said valve in position on said piston, said stud having a port communicating with said passageway, a substantially stationary rod like means extending entirely through said port when said valve is closed for regulating the flow of fluids through said passageway and port and preventing accumulation of particles in said port and passageway, the diameter of said rod like means being less than the diameter of said port, whereby liquid may continuously flow past said rod like member regardless of the open or closed position of said valve, a head at the lower end of said rod like means resting on the inner lower wall of said body portion, and a spring between said head and lower end of said stud for normally holding said rod like means substantially stationary.

3. In a valve structure, a body portion, a cylinder connected therewith, a piston in said cylinder having an inlet opening therethrough for the passage of fluid, and a rod member entering said inlet opening for controlling the passage of fluid and preventing the accumulation of sediment therein, a head at the lower end of said rod like member resting on the inner lower wall of said body portion, and yielding means between said head and lower end of said piston for normally holding said rod member substantially stationary, the cross sectional area of that portion of the rod entering said opening being of uniform diameter throughout its length and of less diameter than the diameter of said inlet opening, whereby a continuous flow of liquid through said inlet opening will result regardless of the open or closed position of said piston.

4. In a valve structure, a body portion, a partition in said body portion having a valve seat, a cylinder associated with said body portion, a piston slidable in said cylinder having an inlet and an outlet passage therethrough, a valve at the lower extremity of said piston for cooperation with the partition valve seat, a stud threaded into the lower axial portion of said piston for retaining said valve onto said piston, said stud having a port communicating with and forming a continuation of said inlet passage, a sealing cup above said piston, a headed stem threaded into said piston for securing the cup to said piston, said stem having a port forming a continuation of said outlet passage, an electrically controlled valve for closing said stem port, and a rod like member fitting loosely in the port of said stud, whereby liquid may pass through said port and inlet passage regardless of the position of said piston and valve carried thereby.

5. In a valve structure, a body portion, a partition in said body portion having a valve seat, a cylinder associated with said body portion, a piston slidable in said cylinder, said piston having an inlet passage for conducting liquid from the inner to the outer end of said piston, an outlet passage for conducting fluid from above said piston, an electrically controlled valve cooperating with said outlet passage for controlling the discharge of liquid therethrough, a valve carried by said piston for cooperation with said valve seat, and a rod like member entering said inlet passage from its lower end for determining the quantity of liquid passing through said passage and preventing the accumulation of foreign particles therein, said rod being loosely fitted in said passage and of uniform cross sectional area throughout its length whereby liquid will flow constantly and uniformly through said passage regardless of the position of said valve with its seat.

ARNOLD F. HOPPE.